2,995,332
LITTER BRACKETS
Frank L. Davis, 129—07 7th Ave., College Point, N.Y.
Filed June 1, 1960, Ser. No. 33,310
2 Claims. (Cl. 248—229)

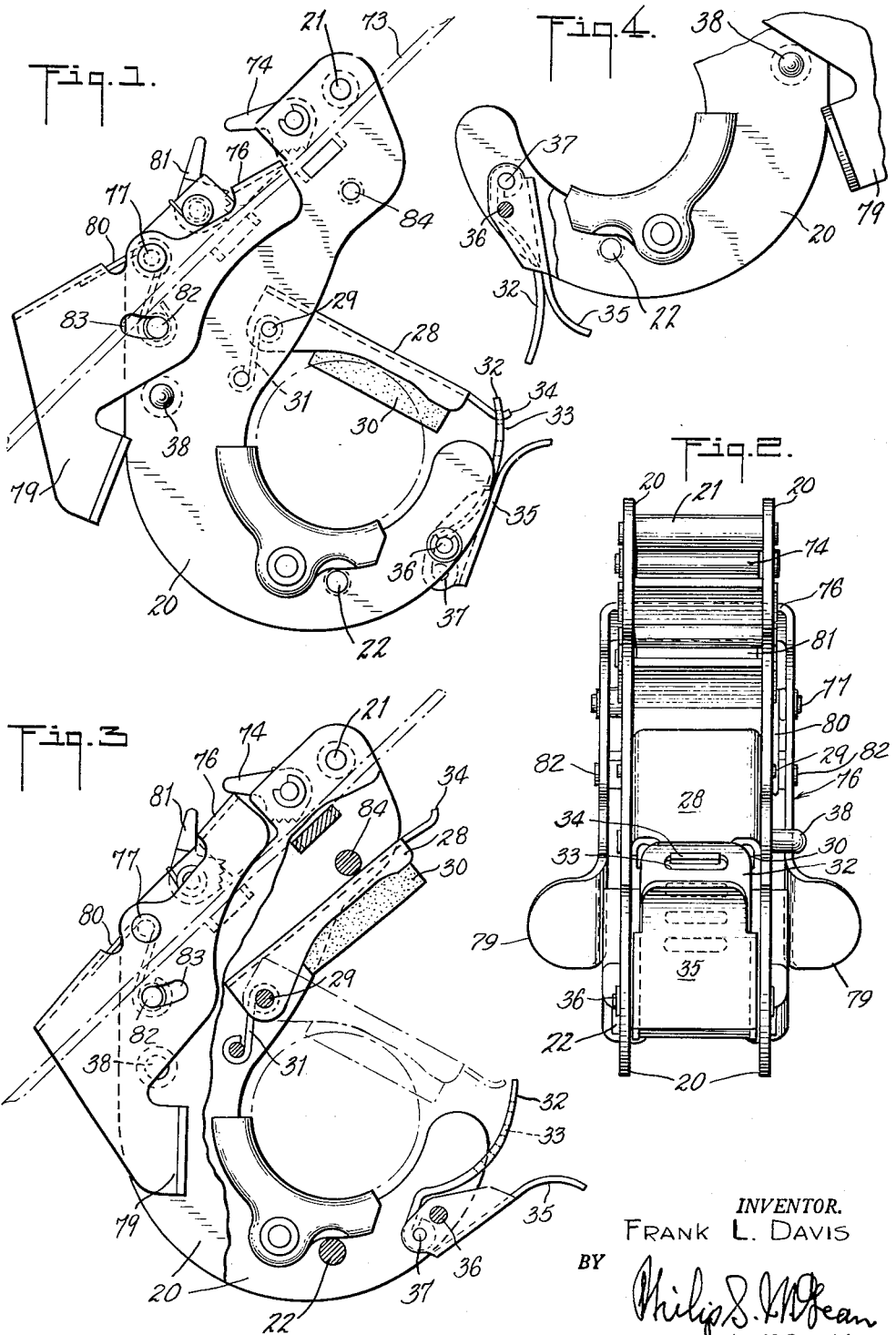

The invention herein disclosed relates to litter brackets of the type covered in the Frank L. Davis Patent 2,901,204 of August 25, 1959, having upwardly faced hooks to receive the litter handles and manually closed and released clamp levers for gripping and holding and firmly securing the litter handles in place.

The present invention involves certain improvements in the handle gripping and releasing mechanism.

Objects of the invention are to provide particularly quick action for securing and releasing the litter handles, which will be operable to grip handles of different size or shape and which will be small and compact, not adding to the bulk or weight of the litter holding hooks.

Further special objects of the invention are to provide handle gripping mechanism which will be safe and reliable in every way and which with the advantages mentioned will be of light weight, inexpensive construction.

Other desirable objects and the novel features of construction, combination and relation of parts through which the purposes of the invention are attained are set forth and will appear in the course of the following specification.

The drawing accompanying and forming part of the specification illustrates a present practical embodiment of the invention, but structure may be modified and changed as regards the immediate illustration, all within the true intent and scope of the invention as hereinafter defined and claimed.

FIG. 1 in the drawing is a side elevation of one of the brackets in the closed litter holding position.

FIG. 2 is a front view of the same.

FIG. 3 is a broken part sectional side elevation, showing the litter holding clamp lever released and also showing the cams which secure the bracket against vertical movement released from the supporting web to permit free vertical adjustment of the bracket. In this view the lower portion of the front hook plate is broken away to show the clamp lever and other parts behind it and some of which are indicated in cross section.

FIG. 4 is a side elevation of the opposite side of the bracket with the locking lever dropped down to leave the hook fully open to receive the litter handle and showing the safety pin which must be depressed before the web clamps can be released to permit vertical adjustment of the bracket.

The litter handle supporting hook structure illustrated is generally similar to that disclosed in the basic patent involving hook plates 20, secured in spaced parallel relation by spacer studs 21, 22, supporting between them a channel cross section lever 28, pivoted on a cross pin 29, and carrying a pad 30, to clamp a litter handle in the open hook formation.

A spring 31, on this pivot pin holds the clamp lever in the open position shown in FIGS. 3 and 4, against a stop pin 84, when not secured by the holddown mechanism.

The latter comprises a pull link 32, having slots 33, to engage over the hooked handle extension 34, on the free end of the clamp lever and a toggle handle 35, pivoted on a cross pin 36, between the hook plates and carrying below the pivotal center 36, a pin 37, to which the lower end of the pull link is pivoted.

FIGS. 1 and 3 show how the pivot center 37, for the pull link is located below and to one side of the pivot center 36, for the locking lever, so as to swing past dead center when the hand lever 35, is shifted from the FIG. 3 to the FIG. 1 position, thus to operate as a toggle for locking the parts in the clamp closed relation, firmly gripping and holding the litter handle in the supporting hook.

With the locking toggle released and dropped down as shown in FIG. 4, the litter supporting hook is fully open and unobstructed, enabling quick seating of a litter handle or removal from the hook.

After locating a litter handle in the open hook, it is only necessary to lower the handle gripping clamp lever 28, using the hook extension 34, as a handle and to then engage the nearest slot in the pull link 32, over that extension and to turn up the locking lever 35, into the FIG. 1 position in which the toggle positively secures and holds the clamp closed down over the litter handle.

To release, it is only necessary to lower the locking lever 35, as in FIGS. 3 and 4, whereupon the pull link may be freed from the hooked extension of the clamp lever.

The bracket shown is arranged for support and vertical adjustment on a web 73, and for such purpose, is provided with web gripping cams or clamps 74 and 81, arranged in engagement with the web to hold it against lowering or lifting movement.

To effect simultaneous release of these holding cams for permitting free vertical adjustment of the bracket, there is provided a release lever 76, pivoted at 77, and having an operating handle 79.

To prevent accidental release of the web holding cams, a spring projected safety pin detent 38, is provided located in the path of releasing movement of lever 79, and which when the bracket is to be shifted can be depressed by hand to permit movement of this lever to free the web cams.

The latter condition is illustrated in FIG. 3, which shows the safety pin 38, depressed to permit operation of the cam releasing handle. In this position, both cams 74 and 81, are lifted clear of the web and the bracket is therefore free to be slid upwardly or downwardly over the web to any selected position.

The release or trip lever 76, is returned to the normal inactive position by a spring 80, so that as soon as pressure on this lever is released, it will swing back to the inactive position, FIG. 1, with the safety pin 38, projecting in front of it and holding it against any accidental or inadvertent operation.

The swinging movement of the trip lever is limited in the illustration by a cross pin 82 projecting through arcuate slots 83 in the sides of this lever. This cross pin serves as an anchorage for one end of the coiled spring 80. The slots 83 preferably are of an extent to permit full necessary swinging movement of the lever but to prevent rubbing engagement of either end of the lever with the supporting web 73 in the extreme positions of movement indicated in FIGS. 1 and 3.

What is claimed is:

1. A litter bracket comprising companion hook plates having open hooks secured in spaced apart substantially parallel relation, means connected with said hook plates for supporting them with said open hooks in upwardly faced position for reception of a litter handle, a handle gripping clamp lever pivotally mounted between said plates above said open hooks and having a litter handle clamping pad engageable over a litter handle seated in said open hooks, a spring urging said lever upwardly away from said open hooks, said lever having a hooked extension at the free end of the same, a handle lever pivoted between said hook plates below the open hooks and a pull link pivoted on said handle lever at a point below the pivotal mounting of said handle lever and having spaced slots positioned to engage the hooked extension of said clamp lever, the pivotal connection of said pull link to said handle lever being located to travel past the dead center position of said connection in respect to the pivotal center of said handle lever to thereby enable said handle lever to operate as a toggle for securing the clamp lever in gripping engagement with a litter handle and said handle lever and the pull link pivoted thereto being both disposed between said spaced apart hook plates and thereby protected by said hook plates against inadvertent release or other unwarranted action.

2. A litter bracket comprising litter handle supporting hooks and means for adjustably supporting the same with the hooks in upwardly faced relation comprising a vertically extending supporting web, web gripping clamps for holding said bracket on said web against vertical movement in either direction, a lever on said bracket operable for simultaneously releasing both said clamps from holding engagement with the web and a manually depressible stop pin for normally holding said releasing lever against clamp releasing movement, said stop pin projecting into the releasing path of movement of said lever and positively preventing the release of said web gripping clamps by the lever but being manually depressible out of the path of releasing movement of the lever and thereby requiring positive displacement of said stop pin before the lever may be operated to permit shifting of the bracket in either direction on the supporting web.

References Cited in the file of this patent

UNITED STATES PATENTS

| | | |
|---|---|---|
| 1,710,273 | Sebring | Apr. 23, 1929 |
| 1,735,932 | Nelson | Nov. 19, 1929 |
| 2,442,266 | Davis | May 25, 1948 |
| 2,869,211 | Kessler | Jan. 20, 1959 |
| 2,901,204 | Davis | Aug. 25, 1959 |
| 2,907,506 | Sammons | Oct. 6, 1959 |

FOREIGN PATENTS

| | | |
|---|---|---|
| 208,977 | Great Britain | of 1924 |